United States Patent [19]

Crosby

[11] 4,168,002
[45] Sep. 18, 1979

[54] MULTIPLE-SEED PACKAGE CARD

[76] Inventor: Leslie O. Crosby, 804 Stump Rd., Chalfont, Pa. 18914

[21] Appl. No.: 930,742

[22] Filed: Aug. 3, 1978

[51] Int. Cl.² ............................................. B65D 75/36
[52] U.S. Cl. ................................... 206/459; 206/461; 206/602
[58] Field of Search ............... 206/459, 461, 532, 534, 206/602; 47/56, 84

[56] References Cited

U.S. PATENT DOCUMENTS

| 571,521 | 11/1896 | Heberline et al. | 206/459 |
|---|---|---|---|
| 1,803,602 | 5/1931 | Dey | 206/459 |
| 3,278,085 | 10/1966 | Brown | 206/484 X |
| 3,288,280 | 11/1966 | Bostrom | 206/461 |
| 3,913,734 | 10/1975 | Siegel | 206/470 |
| 3,933,245 | 1/1976 | Mullen | 206/461 X |

OTHER PUBLICATIONS

A. P. C. Application of Nicolle, Ser. No. 206,498, published 5-18-1943.

Primary Examiner—Donald F. Norton
Attorney, Agent, or Firm—Michael Ebert

[57] ABSTRACT

A carrier card integrating a group of separable blister packages containing seeds of different kinds or varieties having compatible properties, making it feasible to plant these seeds at the same season in a common ground area. The card is divided by a transverse perforation line into an upper display section on whose face is pictured the compatible plants produced by the packaged seeds, and a lower section sub-divided by longitudinal perforation lines into a group of strips. Each strip has adhered to its face a clear plastic bubble backed by a plastic base to create a hermetically-sealed blister package within which is housed a charge of pelleted seeds, the seeds in the packages being of different color to facilitate discrimination therebetween. The bubbles are shaped to define at their lower end a tapered spout which can be snipped off to permit the housed seeds to be dispersed. Each strip is labelled to identify the seed plant, the strip being usable as a ground marker for the plant.

10 Claims, 6 Drawing Figures

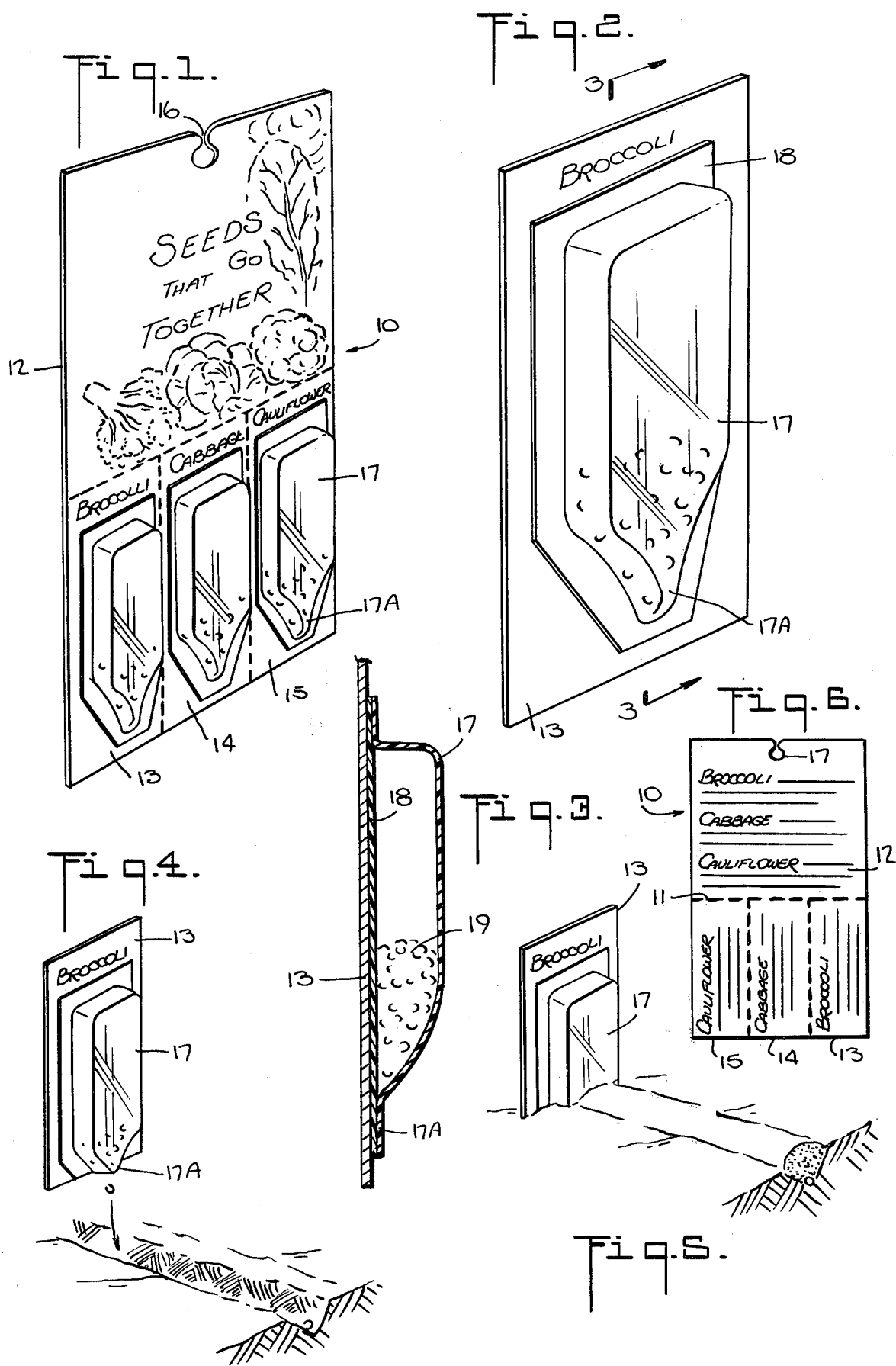

MULTIPLE-SEED PACKAGE CARD

BACKGROUND OF INVENTION

This invention relates generally to the packaging of seeds for vegetables, flowers, herbs and other horticultural products, and more particularly to a carrier card which integrates two or more blister packages for housing seeds that are separable from the carrier card. Though the packages contain seeds of different kinds or varieties, these seeds have compatible properties, so that they may be planted at the same season in a common ground area.

In the conventional gardening procedure for outdoor sowing of seeds to grow flowers, vegetables, herbs and trees, a small hole is made in the soil and one or more seeds is then deposited therein after which the seeds are covered with soil. The depth of the hole and the spacing between adjacent holes depends on the nature of the plant. Thus some plant seeds must be buried close to the surface, while others require deeper holes. Some plants may be raised in close proximity to each other, while others need a wider spacing to allow adequate room for development.

The above procedure is appropriate to large seeded varieties like squash, cucumber, watermelon and cantaloupe. Small seeds are sown in rows with variable spacing between plants and rows, depending upon the kind. In row sowing, the conventional procedure is to dig a narrow trench or row and then sprinkle the small seeds along it. The seeds thereafter are covered with ½, ¼ or ⅛ inch of fine soil, as directed on the seed packet. Seeds that are planted too deeply will rot and never emerge.

There are many other factors which must be taken into account by the gardener, such as the quality of the soil, the degree of sun exposure, the amount of moisture required and the proper season of the year for planting. Since a typical amateur gardener has only a limited ground area available for planting, to make best use of this space, he must be knowledgeable of the various factors which come into play when choosing seeds for his garden.

For example, a gardener who wishes to plant a variety of vegetables in the early summer that will yield a crop in the fall, must be careful to choose vegetable seeds which are compatible with each other in the sense that they can be grown side-by-side in a common area and will mature at about the same time. He would, for example, be ill-advised to plant in an unshaded area the seeds of a vegetable that can tolerate prolonged summer heat next to a vegetable which must be partially shaded to flourish. Moreover, some vegetables thrive best in a rich soil, while others require other soil conditions.

The term "compatibility," as used herein, is not limited to botanical relationships between seeds which make it possible to plant seeds of different kinds or varieties at the same season under like sun and soil conditions, say, in the spring or in the early fall in the northeast region of the United States, but also to aesthetic relationships. Thus in the case of flowers, the color, height of growth and other aesthetic factors must be considered when grouping different flowers together.

Because the choices available to the amateur gardener are ever-increasing, the sensible selection of seeds which are compatible with each other is becoming more difficult. Thus in many modern retail garden outlets, literally thousands of seed packages are on display, each package containing a description of the plant and detailed planting instructions, including the appropriate soil, the sun conditions, the proper time of planting, the depth of the hole, the spacing between the holes or rows and all other factors that must be considered to achieve a successful planting. The typical gardener, faced with so broad a spectrum of seeds and the problem of selecting seeds which are compatible with each other is often thrown into a state of confusion.

The following prior patents are believed relevant to the invention disclosed herein:
Heberline et al.: U.S. Pat. No. 571,521
Brown: U.S. Pat. No. 3,278,085
Middleton, Jr.: U.S. Pat. No. 3,093,244
Siegel: U.S. Pat. No. 3,913,734
Kesinger: U.S. Pat. No. 3,722,137
Woolf: U.S. Pat. No. 2,323,746
Estkowski: U.S. Pat. No. 3,098,321
Nicolle A.P.C. published application: Ser. No. 206,498

SUMMARY OF INVENTION

In view of the foregoing, the main object of this invention is to provide a carrier card which integrates two or more blister seed packages that are separable from the card, which packages contain seeds of different kinds or varieties that exhibit compatible properties.

More particularly, it is an object of this invention to provide a card having an upper display section on which is pictured the several vegetables or other plants produced by the seeds contained in separable blister packages formed in the lower section of the card.

A significant feature of the invention is that each blister package is constituted by a clear plastic bubble backed by a plastic base to create a hermetically-sealed container for the seeds, thereby maintaining a desired degree of seed moisture to prolong the effective life of the seeds.

Also an object of this invention is to provide a card carrying a group of separable blister packages containing compatible seeds, which packages are shaped to define a tapered spout which can be snipped off by the gardener to form a seed dispenser.

Another advantage of a blister package in accordance with the invention is that after the seeds are sown, it is usable as a plant marker to be inserted in the ground to identify the planted seeds.

Briefly stated, in a carrier card in accordance with the invention, the card is divided by a transverse perforation line into an upper display section on whose face there is pictured the compatible plants produced by the packaged seeds and a lower section sub-divided by perforation lines into a group of strips each having adhered to its face a clear plastic bubble backed by a plastic base to cause a hermetically-sealed blister package within which is housed pelleted seeds, the seeds in the group of packages being of different color to facilitate discrimination therebetween. The perforation lines to sub-divide the card may be longitudinal or transverse.

The shape of the bubble in each blister package strip is such as to define a closed, tapered spout which can be snipped off to permit the seeds housed therein to be dispensed. Each strip is labelled to identify the plant developed from the seeds, the strip being usable after the seeds are sown, as a marker to be inserted in the ground. The rear of the display section has printed thereon a description of the plants and their compatible properties, whereas the rear of each strip has printed thereon planting instructions appropriate to the seed in the package.

OUTLINE OF DRAWINGS

For a better understanding of the invention as well as other objects and further features thereof, reference is made to the following detailed description to be read in conjunction with the accompanying drawings, wherein:

FIG. 1 is a front perspective view of a carrier card in accordance with the invention for a group of blister packages containing compatible seeds;

FIG. 2 illustrates one of the blister packages separated from the card;

FIG. 3 is a longitudinal section taken in the plane indicated by line 3—3 in FIG. 2 through the package;

FIG. 4 illustrates the manner in which the package is usable as a seed dispenser;

FIG. 5 shows the package usable as a marker; and

FIG. 6 is a rear view of the card.

DESCRIPTION OF INVENTION

Referring now to FIG. 1, there is shown the face of a rectangular carrier card 10 which is divided by a transverse line of perforations 11 into an upper display section 12 and a lower package section that is sub-divided by three longitudinal lines of perforations into like strips 13, 14 and 15. Upper section 10 is provided at its upper margin with a keyhole 16 making it possible to suspend the carrier cards from a hook, for purposes of counter display or storage.

While the card shown in the drawing is sub-divided to define a 3-pack card, it is to be understood that in practice the card may be provided with a greater number of strips, say, 4 or 5, for packaging a larger group of compatible seeds.

To illustrate the compatibility characteristics of the carrier card, we shall give as an example a 3-pack card containing 20 seeds of broccoli, 200 seeds of cabbage and 75 seeds of cauliflower; a total of 295 seeds which produce a fall crop. These three vegetables are pictured on the face of display section 12 of the card, so that the purchaser can see the products to be obtained from the seeds.

Each strip 13, 14 and 15 in the lower package section has secured thereto a clear plastic bubble 17 whose margin is bonded to a clear plastic base sheet 18 which is adhered to the strip to define a hermetically-sealed blister package. Contained in each package are pelleted seeds 19, the blister package on strip 13 containing broccoli seeds, that on strip 14 cabbage seeds, and that on strip 15 cauliflower seeds. Each strip at its upper end is labelled to idenfity the seeds contained therein.

The seeds are pelleted by an inert material which is a bio-degradable coating such that when the seeds are sown, the coating dissolves to release the seed. The coating material is preferably of a type which constitutes a nutrient for the seeds, as disclosed in the prior Crosby U.S. Pat. No. 4,080,755. The one advantage of pelleted seeds is that they serve to enlarge the seeds and make them easier to handle. Another advantage is that the coating may be dyed, so as to permit ready discrimination between seeds of different types.

The lower end 17A of each bubble 17 has a closed triangular spout formation, such that by snipping off this spout, one may dispense the seeds one at a time into a hole pierced in the ground at the proper depth to receive the seed, as shown in FIG. 4. Each strip and the blister package thereon is separable from the card, which makes it easy to snip off the spout. After the seeds are sown, the strip, which is labelled, may then be used as a marker, as shown in FIG. 5, inserted in the ground to indicate the location of particular seeds.

As shown in FIG. 6, on the rear of display section 10, there is printed a description of the compatible plants and their properties. Thus the broccoli (Green Comet Hybrid) is described as having uniform heads of highest eating quality, single heads being 6 to 7 inches across weighing nearly one pound. Broccoli of this type is heat and disease resistant and mature in 55 days. The cabbage (Stone Head Hybrid) is described as providing an abundant crop in a small area because of its cramped plant habit. Such cabbages develop even in hot weather and mature in 70 days. The cauliflower (Snow King Hybrid) produces firm heads that weigh up to 2 pounds, this vegetable being tolerant to heat and maturing in 50 days.

On the rear face of strips 13, 14 and 15 is printed the planting instructions. Thus in the case of cauliflower, the seeds are to be barely covered in fine soil, they are to be kept evenly moist, and the plants are to be thinned and transplanted to 15 inches in rows 2½ feet apart. The plant prefers rich soil in a sunny location.

The following are other examples of plants which are harmonious or compatible and may therefore be group-packaged in the manner of the present invention:

Salad Fixings:

When radishes, onions and spinach are planted at the same time under cool conditions during the spring or early fall, the gardener can harvest radishes, bunching onions and spinach for a salad. As the onions mature, they look like scallions; then eventually they will mature into 3"–4" dried onions for winter use when spring planted.

Full Season:

The three kinds of tomatoes are red, small fruited cherry and golden. The Toy Boy is used for hanging baskets or intensive gardening and it is earlier than the other two. The large red fruited variety matures after the hanging basket variety or mid-season while the golden tomato is non-acid (for people who cannot eat acid tomatoes) and matures about a week later than the red tomato.

Hanging Baskets:

The Impatiens and Browallia bloom within 10 days of each other and produce red, white and blue separator color hanging baskets. Cuttings may be made in the fall for continued winter enjoyment as house plants.

Partial Shade Plants:

The pansies, coleus and vinca are selected because they will grow and perform well in partial shade. The vinca and pansies are border type flowers while the coleus has medium height for background color.

Window Box:

The flowers have been selected for their compactness in the case of petunia and marigold while the portulaca hangs down and spreads with a dwarf plant habit. When they bloom together, the colors are compatible.

All Season Herbs:

The Sweet Basil is annual, the Parsley is biennial, and the Chives are perennial. However, all of them are usable the first season.

Fall Crop:

These All America Winners mature on compact plants within 10 days of each other. They are related botanically and may be planted in the spring and/or the early fall.

Bountiful Beauties:

A green and golden pepper are featured with maturity about the same time. The eggplant produces fruit set like tomatoes in a cluster. The fruits are about ¾ of the size of regular eggplants. When the leaves are young, they are green, and as they age, they turn purple. Plant height is only 18 inches and it grows well in a container on a patio or in the garden. When the peppers and eggplant are stuffed and served at a buffet, they make an attractive eye-catching combination on a platter.

One of the special advantages of using coated color-coded seeds, particularly when the seeds are small, is that the coating itself may be made such as to represent the proper planting depth. Seeds such as radishes, onions, spinach, lettuce and herbs, may be positioned like "five-on-a-dice" and separated in a row. The gardener, using his finger or a shingle-like board, then presses the coated seeds firmly into the soil which is finely pulverized. When properly planted in this manner, the color of the seed coating remains showing. Since the coating is preferably of a material which absorbs moisture very quickly, it draws the soil moisture to the seeds and uniformly surrounds the seeds with a sheath of moisture to promote germination.

Conventional seeds, when spilled onto the ground, are usually lost because they blend with the color of the soil. When they fall close together, dozens of the emerging seedlings must be pulled out and thrown away. This thinning procedure is virtually eliminated by the present invention, which makes it possible to drop the seeds with the bubble package sower where the gardener wishes them to grow. However, when the gardener uses the present "five-on-a-dice" planting procedure and presses the coated seeds into the soil, all of the seeds are planted at the correct and uniform depth and more usable plants are obtained.

While there has been shown and described a preferred embodiment of a multiple-seed package card in accordance with the invention, it will be appreciated that many changes and modifications may be made therein without, however, departing from the essential spirit thereof. Thus instead of perforating the card longitudinally to form three strips which can be separated therefrom, these perforations may be in the same transverse direction as line 11 and in parallel thereto, so that the blister packages are transverse, not longitudinal, as shown. This simplifies the perforation procedure in mass-production and makes it possible to produce a continuous flow of filled blisters at lower filling costs.

Also, instead of a keyhole 16, a "J" hook configuration may be used to hold the card onto the hook.

I claim:

1. A carrier integrating a group of separable blister packages containing horticultural seeds of different kinds or varieties producing plants having compatible properties, making it feasible to plant these seeds at the same season in a common ground area whereby the seeds are subject to like growth conditions, said carrier comprising:
    A. a card divided by a transverse perforation line into an upper display section on whose face is pictured the compatible plants, and lower package section sub-divided by perforation lines into a group of like strips which may be separated from the card;
    B. a clear plastic bubble adhered to each strip to define a sealed blister-package; and
    C. pelleted seeds in each blister package, the seeds having compatible properties.

2. A carrier as set forth in claim 1, wherein said seeds have a predetermined level of moisture, said bubble being bonded to and backed by a plastic base to create a hermetically-sealed package to maintain said level of moisture.

3. A carrier as set forth in claim 1, wherein the lower end of said blister has a closed spout formation which can be snipped off to permit the seeds to be dispensed therethrough.

4. A carrier as set forth in claim 1, wherein each of said strips has printed on its rear planting instructions for the seeds housed thereby.

5. A carrier as set forth in claim 4, wherein said strips are labelled on the face thereof to identify the plant, whereby the strips may be used as plant markers.

6. A carrier as set forth in claim 1, wherein said display section includes a hole to permit hanging of the cards on a hook.

7. A carrier as set forth in claim 1, wherein said seeds are pelleted by a bio-degradable coating which is a nutrient for the seeds coated thereby.

8. A carrier as set forth in claim 7, wherein said coating is moisture absorbent.

9. A carrier as set forth in claim 1, wherein said pelleted seeds are dyed in different colors to permit discrimination therebetween.

10. A common carrier as set forth in claim 1, wherein said display section in its rear has a description printed thereon of the different compatible plants.

* * * * *